E. E. STUBBS.
Wheel Cultivator.
No. 67,817.
Patented Aug. 13, 1867.
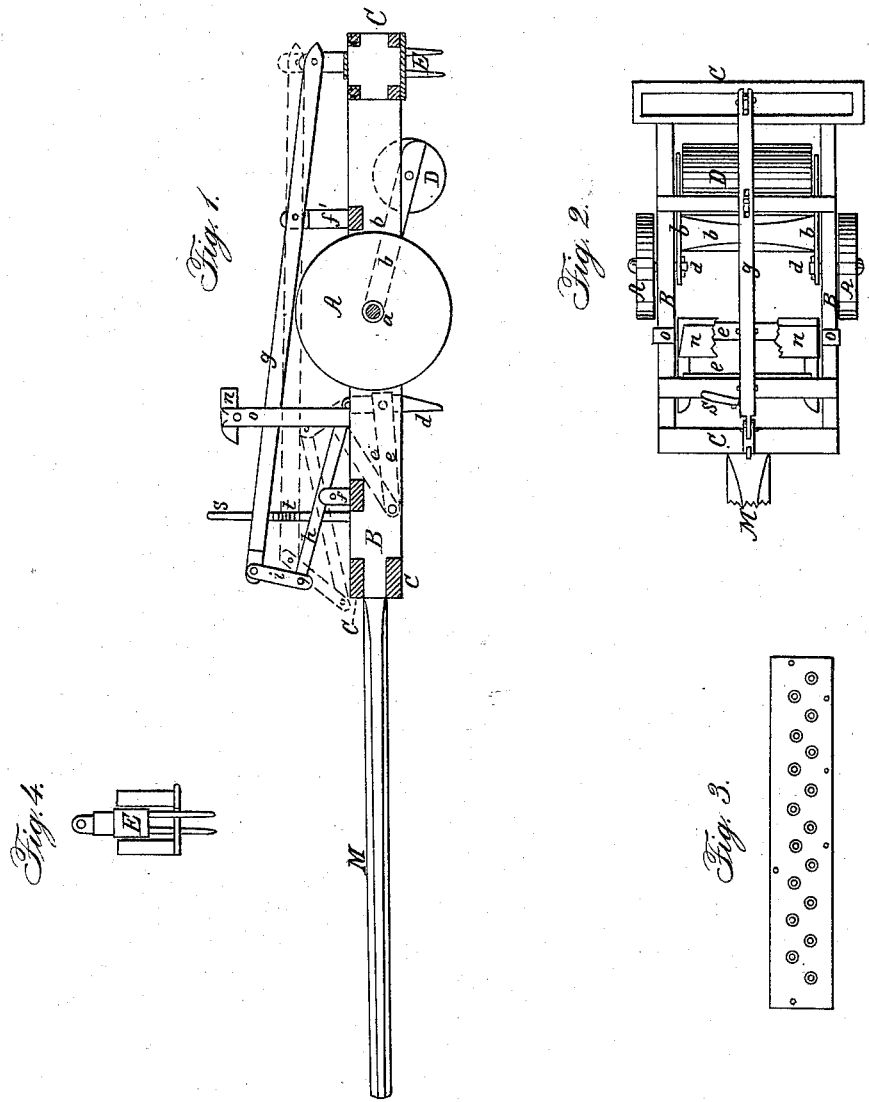
Witnesses:
H. P. K. Peck
Joe B. Brock
Inventor:
Enoch E Stubbs
By his atty
H P K Peck

United States Patent Office.

ENOCH E. STUBBS, OF WEST ELKTON, OHIO.

Letters Patent No. 67,817, dated August 13, 1867.

IMPROVEMENT IN CULTIVATORS.

*The Schedule referred to in these Letters Patent and making part of the same.*

TO WHOM IT MAY CONCERN:

Be it known that I, ENOCH E. STUBBS, of West Elkton, in Preble county, in the State of Ohio, have invented certain new and useful Improvements in Cultivators; and I do hereby declare that the following is a full and exact description thereof, reference being had to the accompanying drawings, and to the letters of reference marked thereon.

Figure 1 represents a side view of my improved cultivator.
Figure 2 represents a plan or top view of the same.
Figure 3 is the clearing-board of the harrow-box; and
Figure 4 is a sectional view of the harrow and its guide-box.

My invention consists in the combination of a roller, a harrow, and cutters, with mechanism for raising and lowering the two latter, arranged in a rectangular frame, as will be herein fully described.

A A represent the wheels supporting the frame B C, in which the pivoted frames $e$ $e$ and $b$ $b$ are placed. The frame $e$ $e$ has a series of knives, $d$, connected with its rear cross-piece, and the frame $b$ $b$ carries the roller D. The rear cross-piece C of the main frame is in the form of a box in which the harrow E is retained, as represented in fig. 4. The bottom portion of the harrow-box is perforated for the harrow-teeth, as seen in fig. 3. Two studs, $f$ $f'$, project upwards from the central portion of the cross-ties of the main frame, and the levers $g$ $h$ are pivoted respectively to the studs $f$ $f'$. These levers are also pivoted to short studs connected with the harrow E and knife-frame $e$ $e$, and levers $g$ and $h$ are also connected together at their front ends by the link $i$, as represented in fig. 1. The driver's seat $n$ is supported upon two uprights, $o$, fastened to the side pieces B of the main frame. The frame $b$ $b$ of the roller D is pivoted to the inner ends of the axle-pins $a$ of the wheels A A, and the knife-frame $e$ $e$ is pivoted to the inner sides of the frame pieces B, as indicated in dotted lines in fig. 1. The tongue $n$ may be connected by hinge fastenings to the main frame, or it may be inserted in a mortise in the front cross-piece C, at any desired angle to the main frame necessary to the proper working of the parts.

When the machine is in use, and as it progresses, the knives $d$, roller D, and harrow E rest upon the ground upon which the wheels A A revolve to carry the machine. The knives $d$ cut and separate the soil over which roller D passes to break up the clods, and finally the harrow penetrates the soil and mellows it in a superior manner. Whenever the harrow becomes foul with weeds or other matter, by means of the lever $g$ the driver may raise it, drawing its teeth through the holes in the bottom board of harrow-box C, and effectually clear its teeth from all obstructions. At the same time that the harrow is elevated, the knife-frame $e$ $e$, with its knives, will be raised up to permit any obstructing matter to become detached therefrom.

Another convenience and advantage of my improved cultivator is in this capability of raising the knives and harrows to pass from field to field, and to pass over obstructions when in use. And when it is necessary to retain the harrow and the knives in an elevated position the hinged lever $s$ may be moved sideways by the attendant so as to bring its notch $t$ over the lever $g$, in front of the seat $n$, which will retain the harrow and knives with the knife-frame $e$ $e$ above and out of contact with obstructions over which the machine may progress.

Having now fully described my invention, what I claim, and desire to secure by Letters Patent, is—

The combination of the knives $d$, roller D, and harrow E, with the levers $g$, $h$, and $s$, perforated harrow-box, and main frame, the parts being arranged, connected, and operating together in the manner and for the purpose specified.

In testimony whereof I have hereunto set my hand this 22d day of May, 1867.

ENOCH E. STUBBS

Witnesses:
H. P. K. PECK,
J. G. LEMMIS.